(12) United States Patent
Gandara et al.

(10) Patent No.: US 11,714,889 B2
(45) Date of Patent: Aug. 1, 2023

(54) METHOD FOR AUTHENTICATION OR IDENTIFICATION OF AN INDIVIDUAL

(71) Applicant: Idemia Identity & Security France, Courbevoie (FR)

(72) Inventors: Renaud Gandara, Courbevoie (FR); Florence Guillemot, Courbevoie (FR); Damien Sevat, Courbevoie (FR); Vincent Despiegel, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 88 days.

(21) Appl. No.: 17/217,331

(22) Filed: Mar. 30, 2021

(65) Prior Publication Data

US 2021/0334581 A1    Oct. 28, 2021

(30) Foreign Application Priority Data

Apr. 24, 2020    (FR) ...................................... 2004116

(51) Int. Cl.
*G06F 21/32*    (2013.01)
*G06V 40/19*    (2022.01)
(Continued)

(52) U.S. Cl.
CPC ............ *G06F 21/32* (2013.01); *G06F 18/253* (2023.01); *G06V 40/168* (2022.01);
(Continued)

(58) Field of Classification Search
CPC .... G06K 9/629; G06V 10/143; G06V 40/168; G06V 40/172; G06V 40/19;
(Continued)

(56) References Cited

U.S. PATENT DOCUMENTS

2014/0002239 A1    1/2014 Rayner
2016/0162673 A1    6/2016 Kutliroff et al.
(Continued)

FOREIGN PATENT DOCUMENTS

CN    110909634 A    3/2020

OTHER PUBLICATIONS

Kim J, Yu S, Kim IJ, Lee S. 3D multi-spectrum sensor system with face recognition. Sensors (Basel). Sep. 25, 2013;13(10):12804-29. doi: 10.3390/s131012804. PMID: 24072025; PMCID: PMC3859038. (Year: 2013).*

*Primary Examiner* — Edward F Urban
*Assistant Examiner* — Wassim Mahrouka
(74) *Attorney, Agent, or Firm* — Womble Bond Dickinson (US) LLP

(57) ABSTRACT

A method for authentication or identification of an individual, comprising the implementation by data processing means (11) of a terminal (1) of the following steps: (a) Obtaining of a visible image, an infrared image and a depth image on each of which a biometric feature of said individual appears; (b) Selection of at least one of said visible images, infrared image and depth image depending on the ambient lighting conditions; (c) Detection of said biometric feature of the individual in each image selected; (d) Fusion of the biometric feature(s) detected; and, (e) Authentication or identification of said individual on the basis of the result of the fusion of the biometric feature(s) detected.

13 Claims, 3 Drawing Sheets

(51) Int. Cl.
*G06V 40/40* (2022.01)
*G06V 40/16* (2022.01)
*G06V 40/18* (2022.01)
*G06F 18/25* (2023.01)

(52) U.S. Cl.
CPC ............ *G06V 40/172* (2022.01); *G06V 40/19* (2022.01); *G06V 40/193* (2022.01); *G06V 40/197* (2022.01); *G06V 40/40* (2022.01)

(58) Field of Classification Search
CPC .... G06V 40/193; G06V 40/197; G06V 40/40; G06V 40/10; G06V 40/16; G06V 40/18; H04L 63/0861; G06F 21/32; H01L 27/14645; H01L 27/14649
See application file for complete search history.

(56) References Cited

U.S. PATENT DOCUMENTS

| | | | |
|---|---|---|---|
| 2019/0080431 A1 | 3/2019 | Choi et al. | |
| 2019/0251245 A1* | 8/2019 | Kim | G06F 21/40 |
| 2019/0251334 A1* | 8/2019 | Kawase | G06V 40/45 |
| 2019/0340349 A1* | 11/2019 | Kong | G06F 21/36 |
| 2019/0347823 A1* | 11/2019 | Yang | G06T 7/73 |
| 2022/0021742 A1* | 1/2022 | Zhang | G06F 16/436 |

\* cited by examiner

[Fig. 1]

[Fig. 3a]
[Fig. 3b]
[Fig. 3c]
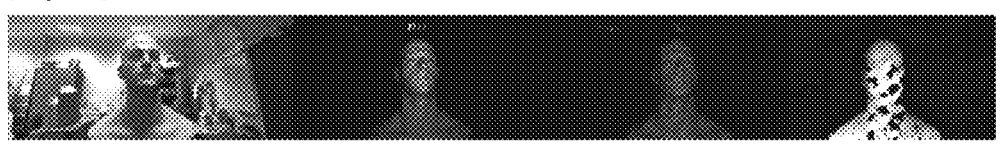
[Fig. 3d]

METHOD FOR AUTHENTICATION OR IDENTIFICATION OF AN INDIVIDUAL

CROSS-REFERENCE TO RELATED APPLICATIONS

This application claims priority pursuant to 35 U.S.C. 119(a) of France Patent Application No. 2004116, filed Apr. 24, 2020, which application is incorporated herein by reference in its entirety.

GENERAL TECHNICAL FIELD

The present invention relates to the field of biometric authentication and identification, in particular by face or iris recognition.

STATE OF THE ART

Biometric access control terminals are known, in particular based on optical recognition: an authorized user positions a biometric feature (his or her face, iris, etc.), in front of the terminal, the latter is recognized and a gate for example is unlocked.

Generally, this type of terminal is equipped with one or more 2D or 3D camera type sensors, with a "wide field of view" which enables the product to be user-friendly (the user does not need to position himself or herself precisely in a specific spot), and light sources such as LEDs, emitting visible or infrared (IR) light, and/or laser diodes. Indeed, the cameras can only function correctly if the illumination of the subject is correct. A face in partial darkness will for example be more difficult to recognize.

Also, it has been observed that "spoofing" techniques in which an individual attempts to fraudulently deceive an access control terminal by means of accessories such as a mask or a prosthesis are more easy to identify under adequate lighting.

It is known to "adjust" the camera and the light sources in order to adapt the exposure in relation to a region of interest detected in the field of view (more precisely, the exposure of any image is modified based on the luminosity observed in this region, in other words the luminosity of the region is "normalized", possibly to the detriment of other regions of the image which could, where applicable, become over- or under-exposed), but it is noted that the variety of installations, light environments, distances of use, considerably complicate this task. In addition, at different times of the day, the light conditions may completely change.

Consequently it would be desirable to have a new simple, reliable and effective solution to improve the performance of biometric authentication and identification algorithms.

SUMMARY OF THE INVENTION

According to a first aspect, the present invention relates to a method for authentication or identification of an individual, characterized in that it comprises the implementation by data processing means of a terminal of the following steps:
(a) Obtaining of a visible image, an infrared image and a depth image on each of which a biometric feature of said individual appears;
(b) Selection of at least one of said visible images, infrared image and depth image based on the ambient lighting conditions;
(c) Detection of said biometric feature of the individual in each image selected;
(d) Fusion of the biometric feature(s) detected;
(e) Authentication or identification of said individual on the basis of the result of the fusion of the biometric feature(s) detected.

According to other advantageous and non limiting characteristics:

Step (a) comprises the acquisition of said visible image from data acquired by first optical acquisition means of the terminal, the acquisition of said infrared image from data acquired by second optical acquisition means of the terminal and/or the acquisition of said depth image from data acquired by third optical acquisition means of the terminal.

In step (b) the visible image is selected if an ambient illuminance value is above a first predetermined threshold, and/or the infrared image is selected if the ambient illuminance value is below a second predetermined threshold, and/or the depth image is selected if the ambient illuminance value is below a third predetermined threshold.

The third predetermined ambient lighting threshold is substantially equal to the second predetermined ambient lighting threshold.

Said second predetermined ambient lighting threshold and/or said third predetermined ambient lighting threshold is(are) at least one hundred times greater than the first predetermined lighting threshold.

Step (d) further comprises the verification of the authenticity of the biometric feature(s) detected based on the depth image.

The visible image, the infrared image and the depth image have approximately the same viewpoint.

Said biometric feature of the individual is selected from a face and an iris of the individual.

Step (e) comprises the comparison of the biometric feature detected with reference biometric data stored on data storage means.

Step (e) comprises the implementation of an access control based on the result of said biometric identification or authentication.

According to a second aspect, the present invention relates to a terminal comprising data processing means configured to implement:
The obtaining of a visible image, an infrared image and a depth image on each of which a biometric feature of said individual appears;
The selection of at least one of said visible images, infrared image and depth image based on the ambient lighting conditions;
The detection of said biometric feature of the individual in each image selected;
The fusion of the biometric feature(s) detected;
The authentication or identification of said individual on the basis of the result of the fusion of the biometric feature(s) detected.

According to other advantageous and non-limiting characteristics, the terminal comprises first optical acquisition means for the acquisition of said visible image and/or second optical acquisition means for the acquisition of said infrared image and/or third optical acquisition means for the acquisition of said depth image.

According to a third and a fourth aspect, the invention proposes a computer program product comprising code instructions for the execution of a method according to the first aspect of authentication or identification of an individual; and a storage means readable by computer equipment on which a computer program product comprises code instructions for the execution of a method according to the first aspect of authentication or identification of an individual.

BRIEF DESCRIPTION OF THE DRAWINGS

Other characteristics and advantages of the present invention will appear upon reading the following description of a preferred embodiment. This description will be given with reference to the attached drawings in which:

FIG. 3a represents a first example of a visible image, infrared image, structured infrared image and depth image used in the method according to the invention;

FIG. 3b represents a second example of a visible image, infrared image, structured infrared image and depth image used in the method according to the invention.

FIG. 3c represents a third example of a visible image, infrared image, structured infrared image and depth image used in the method according to the invention.

FIG. 3d represents a fourth example of a visible image, infrared image, structured infrared image and depth image used in the method according to the invention.

DETAILED DESCRIPTION

Architecture

Figure 1:
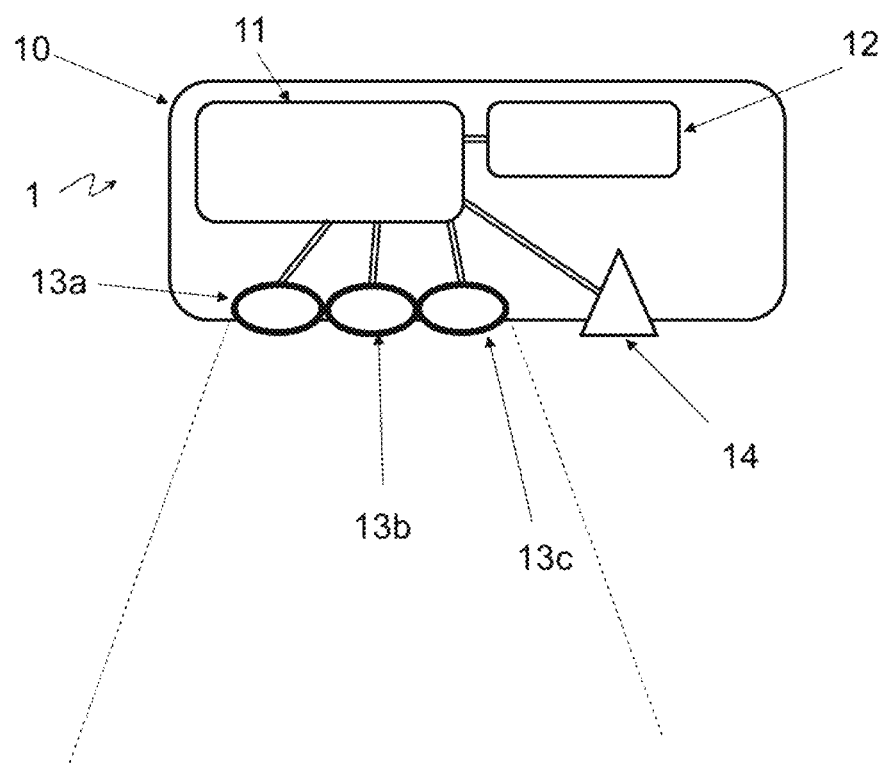
FIG. 1 represents in general a terminal for the implementation of the method for authentication or identification of an individual according to the invention.

Referring to FIG. 1, a terminal 1 is proposed for the implementation of a method for authentication or identification of an individual, i.e. to determine or verify the identity of the individual presenting himself or herself in front of the terminal 1, in order to, where applicable, authorize access to this individual. As will be seen, this is typically face biometrics (facial or iris recognition), in which the user must bring his or her face closer, but also print biometrics (fingerprint or palm) at a distance in which the user brings his or her hand close.

The terminal 1 is typically equipment held and controlled by an entity for whom the authentication/identification must be performed, for example a government body, customs official, a company, etc. It will be understood that it may otherwise be personal equipment belonging to an individual, such as for example a mobile phone or "smartphone", an electronic tablet, a personal computer, etc.

In the remainder of the present disclosure, the example of an access control terminal for a building will be used (for example that enabling a door to open—generally this is a terminal mounted on a wall next to this door), but it should be noted that the present method remains applicable in many situations, for example to authenticate an individual wishing to board an airplane, access personal data or an application, perform a transaction, etc.

The terminal 1 comprises data processing means 11, typically a processor, managing the operation of the terminal 1, and controlling its various components, most commonly in a unit 10 protecting its various components.

Preferably, the terminal 1 comprises first optical acquisition means 13a, second optical acquisition means 13b and/or third optical acquisition means 13c typically arranged in order to observe a space generally located "in front" of the terminal 1 and to acquire a data stream, in particular images of a biometric feature such as the face or the iris of an individual. For example, in the case of a wall-mounted access control terminal, the optical acquisition means 13a, 13b, 13c are positioned at head height in order to be able to see the face of the individuals approaching it. It is noted that there may well be other optical acquisition means 13a, 13b, 13c which could observe another space (and which are not involved in the desired biometric operation): smartphone type mobile terminals generally have both front and rear cameras. The remainder of the present disclosure will focus on the space "opposite" the optical acquisition means 13a, 13b, 13c, i.e. that "facing" the optical acquisition means 13a, 13b, 13c which therefore can be seen and in which performance of the biometric identification or authentication is desired.

The first optical acquisition means 13a, the second optical acquisition means 13b and the third optical acquisition means 13c are different in nature, since as will be seen, the present method uses a first stream of visible images, a second stream of infrared images and a third stream of depth images on each of which a biometric feature of said individual appears.

More precisely, the first and second optical acquisition means 13a, 13b are sensors enabling the acquisition of a "radiation" image, i.e. a standard image in which each pixel reflects the actual appearance of the scene observed, i.e. where each pixel has a value corresponding to the quantity of electromagnetic radiation received in a given part of the electromagnetic spectrum.

The first and second acquisition means 13a, 13b are however distinguished on the part of the electromagnetic spectrum in which they are sensitive, in that the first optical acquisition means 13a enable the acquisition of a visible image (generally a color image—RGB type—for which the value of a pixel defines its color, but also a gray-scale or even black and white image—for which the value of a pixel defines its brightness), i.e. the image as seen by the human eye (the electromagnetic spectrum in question is the visible spectrum—band from 380 to 780 nm), while the second optical acquisition means 13b enable the acquisition of an infrared image (IR—for which the value of a pixel defines its brightness but this time in a band over 800 nm) or even "near" infrared (NIR—band from 700 to 2000 nm).

The third optical acquisition means 13c are sensors facilitating the acquisition of a "depth image" or "depth map", i.e. an image wherein the pixel value is the distance according to the optical axis between the optical center of the sensor and the point observed. A depth image is occasionally represented (in order to be visually understandable), like a gray-scale or color image wherein the luminance of each point is based on the distance value (the closer a point is, the lighter it is) but it should be understood that this is an artificial image as opposed to the radiation images defined above.

It is understood that numerous sensor technologies making it possible to obtain a depth image are known ("time-of-flight", stereovision, sonar, structured light, etc.), and that in most cases, the depth image is in practice reconstructed by the processing means 11 from raw data supplied by the third optical acquisition means 13c and which must be processed (it is reiterated that a depth image is an artificial object which a sensor cannot easily obtain by a direct measurement). Thus, for convenience, the expression "acquisition of the depth image by the third optical acquisition means 13c" will continue to be used even though a person skilled in the art will understand that this acquisition generally involves the data processing means 11.

In the remainder of the present disclosure, the example is thus taken of a depth image obtained from a combination of stereovision and of a structured light infrared image known as "IR 3D".

It is noted that the first, second and third optical acquisition means 13a, 13b, 13c are not necessarily three independent sensors and may be more or less taken together.

For example, what is commonly called a "3D camera" is often a set of two juxtaposed 2D cameras (forming a stereoscopic pair). One of these two cameras may constitute the first or the second optical acquisition means 13a, 13b, and the two together the third optical acquisition means 13c.

Moreover, the biometric feature to be acquired from said individual (his or her face, iris, etc.) must appear at least in part on both the radiation images and on the depth image, such that they must be able to observe more or less the same space. Preferably, the first, second and third optical acquisition means 13a, 13b, 13c have substantially the same viewpoint, i.e. they are arranged close together, at most a few tens of centimeters apart, advantageously a few centimeters (in the example of two cameras forming a stereoscopic pair, their distance is conventionally of the order of 7 cm), with optical axes that are parallel or oriented one in relation to the other at most by a few degrees. This will be the case in the examples which will be presented below, where it will be seen that the viewpoints and the orientations match.

However, it is still possible to have more widely spaced sensors, as long as recalibration algorithms are known (knowing their relative positions and orientations).

Of course, the first, second and third optical acquisition means 13a, 13b, 13c are synchronized in order to acquire data substantially simultaneously. The three images must represent the individual substantially at the same moment (i.e. within a few milliseconds or a few dozen milliseconds), even though it is still entirely possible to operate these means 13a, 13b, 13c independently (see below).

Furthermore, the terminal 1 may advantageously comprise lighting means 14 adapted to illuminate said space opposite said optical acquisition means 13a, 13b, 13c (i.e. they will be able to illuminate the subjects visible by the optical acquisition means 13a, 13b, 13c, they are generally positioned near the latter in order to "look" in the same direction). Thus, it is understood that the light emitted by the lighting means 14 is received and re-emitted by the subject towards the terminal 1, which allows the optical acquisition means 13a, 13b, 13c to acquire data of correct quality and to increase the reliability of any subsequent biometric processing.

Finally, the data processing means 11 are often connected to data storage means 12 storing a reference biometric database, preferentially of images of faces or of irises, in order to make it possible to compare a biometric feature of the individual appearing on the visible image with the reference biometric data. The means 12 may be those of a remote server to which the terminal 1 is connected, but they are advantageously local means 12, i.e. included in the terminal 1 (in other words the terminal 1 comprises the storage means 12), in order to avoid any transfer of biometric data to the network and to limit risks of interception or of fraud.

Method

Figure 2:
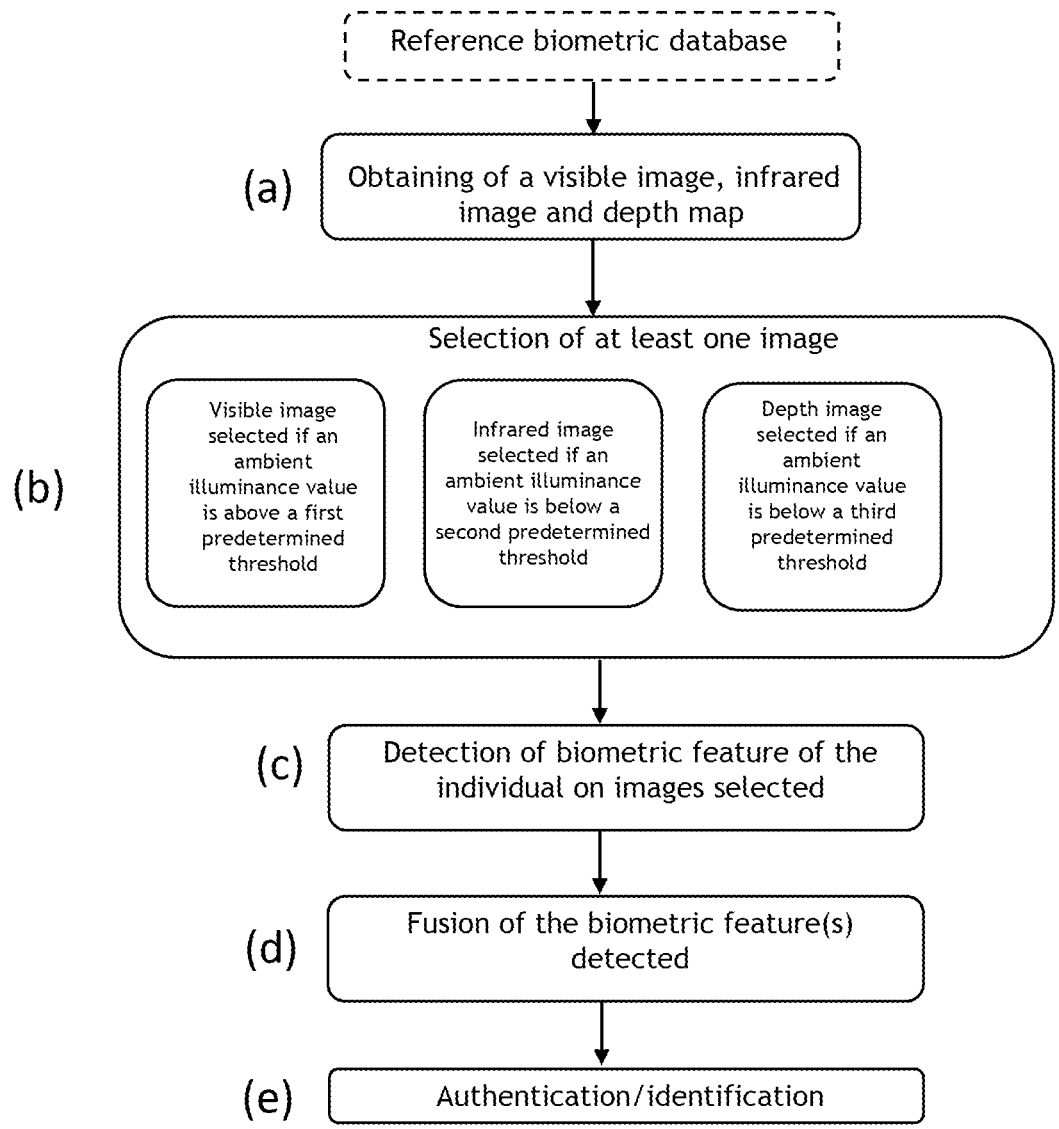
FIG. 2 schematically represents the steps of an embodiment of the method for authentication or identification of an individual according to the invention.

Referring to FIG. 2, the present method, implemented by the data processing means 11 of the terminal 1, starts with a step (a) of obtaining a visible image (in practice a stream of visible images known as first stream for convenience), an infrared image (in practice a stream of infrared images known as second stream) and a depth image (in practice a stream of depth images known as third stream), on each of which a biometric feature of said individual appears. "Stream" is understood to mean a sequence of said images over time, generally acquired at a predetermined frequency such as 15 Hz.

As explained, if the terminal 1 directly comprises the first optical acquisition means 13a, the second optical acquisition means 13b and/or the third optical acquisition means 13c, this step may comprise the acquisition of data by these means 13a, 13b, 13c and the respective obtaining of the visible image from data acquired by the first optical acquisition means 13a, of the infrared image from data acquired by the second optical acquisition means 13b and/or of the depth image by the third optical acquisition means 13c.

However, the method is not limited to this embodiment, and said images/maps may be obtained externally and simply transmitted to the data processing means 11 for analysis.

In a next step (b), the method comprises the selection of at least one of said visible images, infrared image and depth image based on the ambient lighting conditions.

Indeed, as will be seen, the clever idea underpinning the present invention is to note that the three streams have different levels of robustness based on these lighting conditions, and to benefit from this. Thus, the different images will be able to act as redundant objects in order to guarantee optimum detection regardless of the lighting conditions.

"Ambient lighting conditions" is understood to mean the lighting conditions of the environment, independently of the impact of the lighting means 14, i.e. the conditions experienced by the terminal. These ambient lighting conditions are expressed in the form of an illuminance value in lux, and depend on the sun (time of day, weather), the openings in the room in which the terminal 1 is installed (shutters/curtains), lighting fixtures in this room, etc.

FIG. 3a, FIG. 3b and FIG. 3c thus demonstrate, under three very different lighting conditions, from left to right, the visible image, then the infrared image, the structured light illuminated infrared image, and finally the depth image (obtained among others from the structured light illuminated infrared image):

FIG. 3a considers a case of "normal" lighting conditions, namely average illuminance. It shows that all the images are of good quality.

FIG. 3b considers a first case of "extreme" lighting conditions, namely very low illuminance (less than 25 lux). It shows that the visible image is very noisy (as it increases the gain, and the exposure time is extended).

FIG. 3c considers a second case of "extreme" lighting conditions, namely very high illuminance (over 25,000 lux). This time it shows the beginning of infrared saturation and a loss of structured light influencing the quality of the 3D and therefore of the depth image.

Note that in general, regardless of the acquisition technology, the depth images lose quality at high brightness.

It is thus possible to define a first, a second and/or a third predetermined ambient lighting threshold, such that:

the visible image is selected if (preferentially only if) an ambient illuminance value is above a first predetermined threshold (as the visible image is of good quality at average or high brightness), and/or the infrared image is selected if (preferentially only if) the ambient illuminance value is below a second predetermined threshold (as the infrared image is of good quality at average or low brightness), and/or the depth image is selected if (preferentially only if) the ambient illuminance value is below a third predetermined threshold (as the depth image is of good quality at average or low brightness).

Advantageously, the three conditions are applied, even if for example it would be possible to use only the first and second thresholds, i.e. select the depth image every time).

The second threshold and/or the third threshold are preferentially selected above or even considerably above (at least 100 times or even 1000 times greater) the first threshold, in order to define at least three illuminance ranges:
- a lower range, below the first threshold, in which only the infrared and depth images are selected;
- an intermediate range, above the first threshold and below each of the second and third thresholds, in which all the images are selected;
- an upper range, above each of the second and third thresholds, in which only the visible image is selected.

It is noted that the second and third thresholds preferentially match, but there may be one difference, which would make possible the existence of a range between the intermediate range and the upper range in which only the visible image and one of the infrared image and the depth image would be selected.

In terms of values, it is possible to choose for the first threshold for example less than 250 lux, or even less than 100 lux, or even less than 50 lux, or even 25 lux, and for the second and/or third thresholds for example over 2500 lux, or even over 5000 lux, or even over 10,000 lux, or even 25,000 lux, but no value is limiting and it will all depend on the environment of the terminal 1.

It is noted that no image selection function is limiting, since the comparison with a threshold is only one possibility among others.

Detection

Methods are already known in which a visible image, an infrared image and a depth image are used, such as for example the method described in the document "3D Multi-Spectrum Sensor System with Face Recognition", by Joongrock Kim, Sunjin Yu, Ig-Jae Kim, and Sangyoun Lee.

However, the idea is always to "combine" the images, notably by creating a multispectral object and/or reconstructing a 3D model.

It is understood that not only is it not possible to take advantage of the fact that the three streams have differing levels of robustness based on these lighting conditions, but on the contrary quality processing is only possible when the lighting conditions are optimal for all the images, i.e. in a fairly low band.

On the contrary, the present method proposes in a step (c) to detect said biometric feature of the individual in each image selected, independently.

In other words, it is possible to perform up to 3 detections, and due to the prior selection it is guaranteed that each detection is of good quality.

It may be possible to choose any detection technique known by a person skilled in the art, and notably to use a convolutional neural network, CNN, for detection/classification.

The step (c) may comprise the prior identification in each image (and preferentially the depth image) of a region of interest likely to contain said biometric feature. Region of interest is understood to mean one (or more, the region of interest is not necessarily a continuous unit) spatial zone semantically more interesting and on which it is estimated that the desired biometric feature will be found (and not outside this region of interest).

Thus, it is well known to attempt to identify a region of interest directly in a radiation image, but it is considerably easier to do it in the depth image if it has been selected:
- the latter is only slightly affected by the exposure (the depth image does not contain any information dependent on the brightness);
- is very discriminating as it makes it possible to easily separate the distinct objects and notably those in the foreground in relation to those in the background.

For this, said region of interest is advantageously identified as all of the pixels of said depth image associated with a depth value in a predetermined range, advantageously the nearest pixels. This is simple thresholding of the depth image, making it possible to filter the objects at the desired distance from terminal 1, optionally combined with an algorithm making it possible to aggregate pixels into objects or blobs (to avoid having several distinct regions of interest corresponding for example to several faces which may or may not be at the same distance).

Preferably, the range [0; 2 m] or even [0; 1 m] will be used for example in the case of a wall-mounted terminal 1, but depending on the case, it may be possible to vary this range (for example in the case of a smartphone type personal terminal, this could be limited to 50 cm).

Alternatively or additionally, it is possible to implement a detection/classification algorithm (for example via a convolutional neural network, CNN) on the images in order to identify said region of interest likely to contain said biometric feature, for example the closest human figure.

In all cases, it is possible to obtain one or more masks defining one or more zones of interest on one or other of the images, which can be applied to the other images selected in order to reduce the detection area.

In a conventional manner, the step (c) may also comprise the adaptation of the exposure of each image selected in relation to the region of interest identified. To do this, as explained, the exposure of the entire image is normalized in relation to that of the zone considered: thus, there is no doubt that the pixels in the region of interest are exposed in an optimal way, where applicable to the detriment of the rest of the image, but this is of no importance as the information in this rest of the visible image has been rejected.

Thus:
- the time and complexity of the detection algorithm are reduced as only a fraction of the images needs to be analyzed;
- the risks of false positives on the part not selected are eliminated (common if a detection CNN is used);
- there is no doubt that the detection conditions are optimal in the region of interest and therefore that the detection performance therein is optimal.

Fusion

Then, in a step (d), fusion of the biometric feature(s) detected is performed, i.e. the matching of the various detection results on one or other of the images, generally identifying the potential biometric feature in the form of a detection "box", for example a rectangle surrounding a face.

In fact, insofar as there are several images on which detection has been performed independently, it is possible that a same feature has been detected on the different images, or on the contrary different features.

It is even quite possible at this stage that several "candidate" biometric features are detected in the same visible, infrared or depth image.

The objective of the fusion is to "aggregate" the streams on the one hand by collecting all the candidate biometric features (i.e. detected on at least one image), while identifying the "best" candidates (those detected on several images, and having certain additional characteristics such as correct position in relation to cameras, correct distance, etc.).

Depending on the number of images selected, said fusion is firstly advantageously performed between the 2D streams (i.e. the visible image and the infrared image) and coated with the 3D stream (the depth image).

For this, the first, second and third optical acquisition means 13a, 13b, 13c are preferentially synchronized in order to acquire data approximately simultaneously. The visible image and the depth image must represent the individual substantially at the same moment (within a few milliseconds or a few dozen milliseconds), even though it is still entirely possible to operate these means 13a, 13b, 13c in an entirely independent manner (see below).

The fusion of detections can be performed by directly comparing the coordinates of the features detected, particularly if the three images have substantially the same viewpoint and the same direction.

Alternatively, the pixel coordinates are transposed from one detection of an image to another taking into account positions and orientations of the cameras, in a manner known by a person skilled in the art. For example, this can be performed by learning the characteristics of the camera systems automatically (parameters intrinsic to the camera such as the focal length and the distortion, and extrinsic parameters such as the position and the orientation). This learning performed once for all then makes it possible to perform the "projection" (recalibration) by calculations during image processing.

In the case in which a single image is selected, it is understood that the fusion is of little importance: the biometric feature(s) detected on this image are retained, even if one or more best candidates can still be selected.

Regarding the selection of "best candidates" for detection, numerous techniques are known to a person skilled in the art, and it may be possible for example to classify the detections according to various criteria, or even to use tracking algorithms to see whether these detections continue indefinitely, etc.

Preferably, the step (d) further comprises verification of the authenticity of the biometric feature detected based on the depth image.

The idea is to perform anti-spoofing on all or some of the biometric features detected, particularly after fusion, based on the depth image.

Indeed, spoofing mainly concerns flat masks or semi-flat masks which can deceive the detection algorithms on a visible or infrared image, but which are easy to identify on the depth image, as is notably seen in the example of FIG. 3d.

Identification and Authentication

Finally, in a step (e), the authentication or identification strictly speaking of said individual is performed on the basis of the result of the fusion of the biometric feature(s) detected, for example on the basis of the best candidate biometric feature of each image.

More precisely, as explained said biometric feature detected is considered to be candidate biometric data, and it is compared with one or more reference biometric data in the database of the data storage means 12.

All that needs to be done is then to check that this candidate biometric data matches the/one reference biometric data. In a known manner, the candidate biometric data and the reference biometric data match if their distance according to a given comparison function is less than a predetermined threshold.

In the case where a candidate biometric feature is found in several images selected, this comparison is performed as many times as there are images selected. Indeed, it is possible to have as many reference biometric databases as there are stream types (visible, infrared, depth), and in order for identification/authentication to be confirmed, this must be done for each image selected.

Thus, the implementation of the comparison typically comprises the calculation of a distance between the data, the definition whereof varies based on the nature of the biometric data considered. The calculation of the distance comprises the calculation of a polynomial between the components of the biometric data, and advantageously, the calculation of a scaler product.

For example, in a case where the biometric data have been obtained from images of an iris, a conventional distance used for comparing two data is the Hamming distance. In the case where the biometric data have been obtained from images of the individual face, it is common to use the Euclidean distance.

This type of comparison is known to the person skilled in the art and will not be described in more detail hereinafter.

The individual is authenticated/identified if the comparison reveals a rate of similarity between the candidate data and the/one reference data exceeding a certain threshold, the definition whereof depends on the calculated distance, for each image.

Terminal

According to a second aspect, the present invention relates to the terminal 1 for the implementation of the method according to the first aspect.

The terminal 1 comprises data processing means 11, of processor type, advantageously first optical acquisition means 13a (for the acquisition of a visible image) and/or second optical acquisition means 13b (for the acquisition of an infrared image) and/or third optical acquisition means 13c (for the acquisition of a depth image), and where applicable data storage means 12 storing a reference biometric database.

The data processing means 11 are configured to implement:
  The obtaining of a visible image, an infrared image and a depth image on each of which a biometric feature of said individual appears;
  The selection of at least one of said visible images, infrared image and depth image based on the ambient lighting conditions;
  The detection of said biometric feature of the individual in each image selected;
  The fusion of the biometric feature or features detected;
  The authentication or identification of said individual on the basis of the result of the fusion of the biometric feature or features detected.

According to a third and a fourth aspects, the invention relates to a computer program product comprising code instructions for execution (in particular on data processing means 11 of the terminal 1) of a method according to the first aspect of the invention for authentication or identification of an individual, as well as storage means readable by computer equipment (a memory 12 of the terminal 2) on which this computer program product is located.

The invention claimed is:

1. A method for authentication or identification of an individual, comprising an implementation by data processing means (11) of a terminal (1) the steps of:
   (a) obtaining a visible image, an infrared image and a depth image on each of which a biometric feature of the individual appears;
   (b) selecting at least one of said visible images, infrared image and depth image based on ambient lighting conditions;
   (c) detecting the biometric feature of the individual in each image selected;
   (d) fusing the biometric feature or features detected; and
   (e) authenticating or identifying the individual on the basis of the result of the fusion of the biometric feature or features detected,
   wherein in step (b) the visible image is selected only if an ambient illuminance value is above a first predetermined threshold, the infrared image is selected only if the ambient illuminance value is below a second predetermined threshold, and the depth image is selected only if the ambient illuminance value is below a third predetermined threshold.

2. The method according to claim 1, wherein step (a) comprises acquiring the visible image from data acquired by first optical acquisition means (13a) of the terminal (1), acquiring the infrared image from data acquired by second optical acquisition means (13b) of the terminal (1) and/or acquiring the depth image from data acquired by third optical acquisition means (13c) of the terminal (1).

3. The method according to claim 1, wherein the third predetermined threshold is equal to the second predetermined threshold.

4. The method according to claim 1, wherein the second predetermined threshold and/or the third predetermined threshold is(are) at least one hundred times greater than the first predetermined threshold.

5. The method according to claim 1, wherein step (b) comprises the selecting a depth image and wherein step (d) comprises verifying an authenticity of the detected biometric feature(s).

6. The method according to claim 1, wherein the visible image, the infrared image and the depth image have substantially the same viewpoint.

7. The method according to claim 1, wherein said biometric feature of the individual is selected from a face and an iris of the individual.

8. The method according to claim 1, wherein step (e) comprises comparing the biometric feature detected with reference biometric data stored on data storage means (12).

9. The method according to claim 1, wherein step (e) comprises implementing an access control based on the result of said biometric identification or authentication.

10. A terminal (1) comprising data processing means (11) configured to implement:
    obtaining a visible image, an infrared image and a depth image on each of which a biometric feature of said individual appears;
    selecting at least one of said visible images, infrared image and depth image based on the ambient lighting conditions;
    detecting said biometric feature of the individual in each image selected;
    fusing the biometric feature or features detected; and
    authenticating or identifying said individual on the basis of the result of the fusion of the biometric feature(s) detected,
    wherein during said selecting, the visible image is selected only if an ambient illuminance value is above a first predetermined threshold, the infrared image is selected only if the ambient illuminance value is below a second predetermined threshold, and the depth image is selected only if the ambient illuminance value is below a third predetermined threshold.

11. The terminal according to claim 8, comprising first optical acquisition means (13a) for the acquisition of said visible image and/or second optical acquisition means (13b) for the acquisition of said infrared image and/or third optical acquisition means (13c) for the acquisition of said depth image.

12. A non-transitory computer-readable medium comprising code instructions for executing the method according to claim 1 for authentication or identification of an individual, when said code instructions are executed on a computer.

13. A storage means readable by a computer equipment on which a non-transitory computer program product comprises code instructions for executing the method according to claim 1 for authentication or identification of an individual.

* * * * *